US012667215B2

(12) United States Patent
Pas

(10) Patent No.: US 12,667,215 B2
(45) Date of Patent: Jun. 30, 2026

(54) FLOCKING AND METHODS OF MAKING SAME

(71) Applicants: Hylke Pas, Halle (NL); Belgravia Wood Limited, Hong Kong (HK)

(72) Inventor: Hylke Pas, Halle (NL)

(73) Assignee: Belgravia Wood Limited, Central (HK)

( * ) Notice: Subject to any disclaimer, the term of this patent is extended or adjusted under 35 U.S.C. 154(b) by 79 days.

(21) Appl. No.: 18/041,775

(22) PCT Filed: Aug. 17, 2021

(86) PCT No.: PCT/IB2021/057574
§ 371 (c)(1),
(2) Date: Feb. 15, 2023

(87) PCT Pub. No.: WO2022/038520
PCT Pub. Date: Feb. 24, 2022

(65) Prior Publication Data

US 2023/0292946 A1 Sep. 21, 2023

Related U.S. Application Data

(60) Provisional application No. 63/067,078, filed on Aug. 18, 2020.

(51) Int. Cl.
*A47G 33/08* (2006.01)
*B05D 1/14* (2006.01)

(52) U.S. Cl.
CPC ........... *A47G 33/0845* (2013.01); *B05D 1/14* (2013.01)

(58) Field of Classification Search
CPC .. A47G 33/0845; B05D 1/14; B05D 2451/00; B05D 7/56; B05D 1/16
See application file for complete search history.

(56) References Cited

U.S. PATENT DOCUMENTS 2,290,428 A * 7/1942 Hart .......................... B44C 5/06 428/22
3,377,184 A * 4/1968 Kukoff ..................... B05D 5/06 428/206

(Continued)

FOREIGN PATENT DOCUMENTS

CA 2431607 A1 12/2003
DE 202006017335 U1 1/2007

(Continued)

OTHER PUBLICATIONS

SikaTherm®-4150 (Technical Data Sheet for SikaTherm-4150 Water-based high-performance flock adhesive, Nov. 2017. (Year: 2017).*

(Continued)

*Primary Examiner* — Christopher W Raimund
(74) *Attorney, Agent, or Firm* — Finnegan, Henderson, Farabow, Garrett & Dunner LLP

(57) ABSTRACT

Disclosed herein are methods and items for flocking festive goods or holiday decorations, such as trees and wreaths, that reduce the loss of flocking material. The method can include applying a first glue emulsion onto an item, applying one or more layers of flocking material onto the glue emulsion, and applying one of: a second glue emulsion, an acrylic, or acrylic-like substance, over the one or more layers of flocking material. A decorative item can include one or more layers of flocking material, and a layer of: a glue emulsion, an acrylic, and/or acrylic-like substance applied on the one or more layers of flocking material.

19 Claims, 6 Drawing Sheets

(56) References Cited

U.S. PATENT DOCUMENTS

| | | | | | |
|---|---|---|---|---|---|
| 4,734,307 | A * | 3/1988 | Thorsrud | D04H 11/00 | 428/95 |
| 6,200,410 | B1 * | 3/2001 | Kukoff | B44F 1/02 | 156/320 |
| 6,214,141 | B1 | 4/2001 | Kim et al. | | |
| 2006/0160943 | A1 * | 7/2006 | Weir | C09J 175/04 | 524/507 |

FOREIGN PATENT DOCUMENTS

| | | | | |
|---|---|---|---|---|
| FR | 2207669 | A1 | | 6/1974 |
| FR | 2691082 | A1 | | 11/1993 |
| JP | H10258472 | A | | 9/1998 |
| JP | 2004016966 | A | | 1/2004 |
| JP | 2006181402 | A | * | 7/2006 |
| WO | 9804360 | A1 | | 2/1998 |
| WO | 2009015618 | A1 | | 2/2009 |

OTHER PUBLICATIONS

International Search Report for International Application No. PCT/IB2021/057574 dated Nov. 17, 2021, 5 pages.

* cited by examiner

FLOCKING AND METHODS OF MAKING SAME

TECHNICAL FIELD

The present disclosure generally relates to festive goods and holiday decorations and, more particularly, flocking that is applied to artificial or real Christmas trees, wreaths and the like, which is applied during the manufacturing process in a manner and method to ensure that the flocking does not break away or turn to dust upon minimal use or handling.

CROSS REFERENCES TO RELATED APPLICATIONS

This application is the National Phase of PCT International Application No. PCT/IB2021/057574, filed on Aug. 17, 2021, which claims the benefit of U.S. Provisional Application No. 63/067,078 filed on Aug. 18, 2020. The entire contents of the above-referenced applications are incorporated herein by reference.

BACKGROUND

Flocking Christmas decorations are growing in popularity across all age groups. It is a way to enjoy a "white" or snowy Christmas in any part of the nation or world.

Conventionally, the flocking process includes two steps, the first being, glue emulsion is applied onto an item by spraying, such as tree branches, and the second, fine paper or cotton particles, which can be called flocking material, is sprayed onto the glue emulsion, thereby being more or less bonded to the item by the glue emulsion. The amount or extent of glue emulsion is sometimes varied and the materials used for the flocking are sometimes varied, but the results have not proved satisfactory because either the flocking is made to look less realistic, or even more dust results.

A long-standing problem exists with existing flocking, that being how to keep the flocking material from breaking away and turning to debris. While more and more people want the look of flocking, they do not want the negatives of flocking, like more dust or small debris particles in their homes resulting from the breaking away of flocking material. Therefore, there is a need to create an improved way to flock trees, wreaths, or other decorative items with flocking that will better adhere to the item and not turn to particles or debris upon minimal use and handling, while maintaining or even improving the realistic look of the flocking.

SUMMARY

Embodiments of the disclosure provide a flocking method. The flocking method includes applying a first glue emulsion onto an item; applying one or more layers of flocking material onto the first glue emulsion; and applying one of: a second glue emulsion, an acrylic, or acrylic-like substance, over the one or more layers of flocking material.

Embodiments of the disclosure also provide a flocking method. The flocking method includes applying a first glue emulsion onto an item; applying a first layer of flocking material onto the item; and applying a second glue emulsion over the one or more layers of the flocking material.

Embodiments of the disclosure further provide a decorative item. The decorative item includes one or more layers of flocking material; and a layer of: a glue emulsion, an acrylic, or acrylic-like substance applied on the one or more layers of flocking material.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. The terms and definitions provided herein control, if in conflict with terms or definitions incorporated by reference.

Embodiments of the present disclosure provide methods and items for flocking festive goods or holiday decorations, such as trees and wreaths, that reduce the loss of flocking material. The existing methods, including varying the extent of use of a glue emulsion or varying the material used as the flocking, often result in either less realistic-looking flocking or more dust particles, and thus are not sufficient to create a satisfying customer experience. One aspect of the present disclosure ensures that the undesired loss of flocking material is reduced by using improved materials and methods.

Figures 1A, 1B:
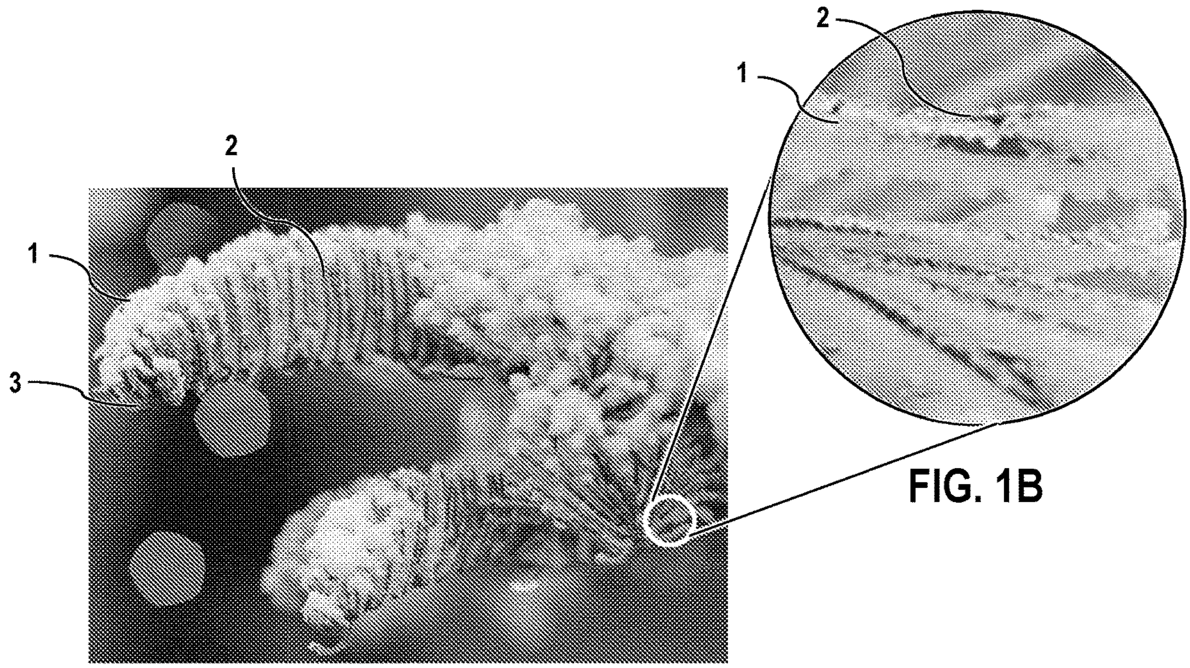
FIG. 1B PRIOR ART
FIGS. 1A-1B illustrate an example tree with flocking thereon.

FIGS. 1A-1B illustrate an example of a prior art artificial tree with flocking. In an example decorative good, such as an artificial tree, flocking 1 can at least partially coat or rest upon foliage 2 and/or branch 3 of the tree. Depending on the flocking material and its application on to the foliage 2 and/or branch 3, the flocking can give the tree an appearance of being at least partially covered in snow.

Figure 2:
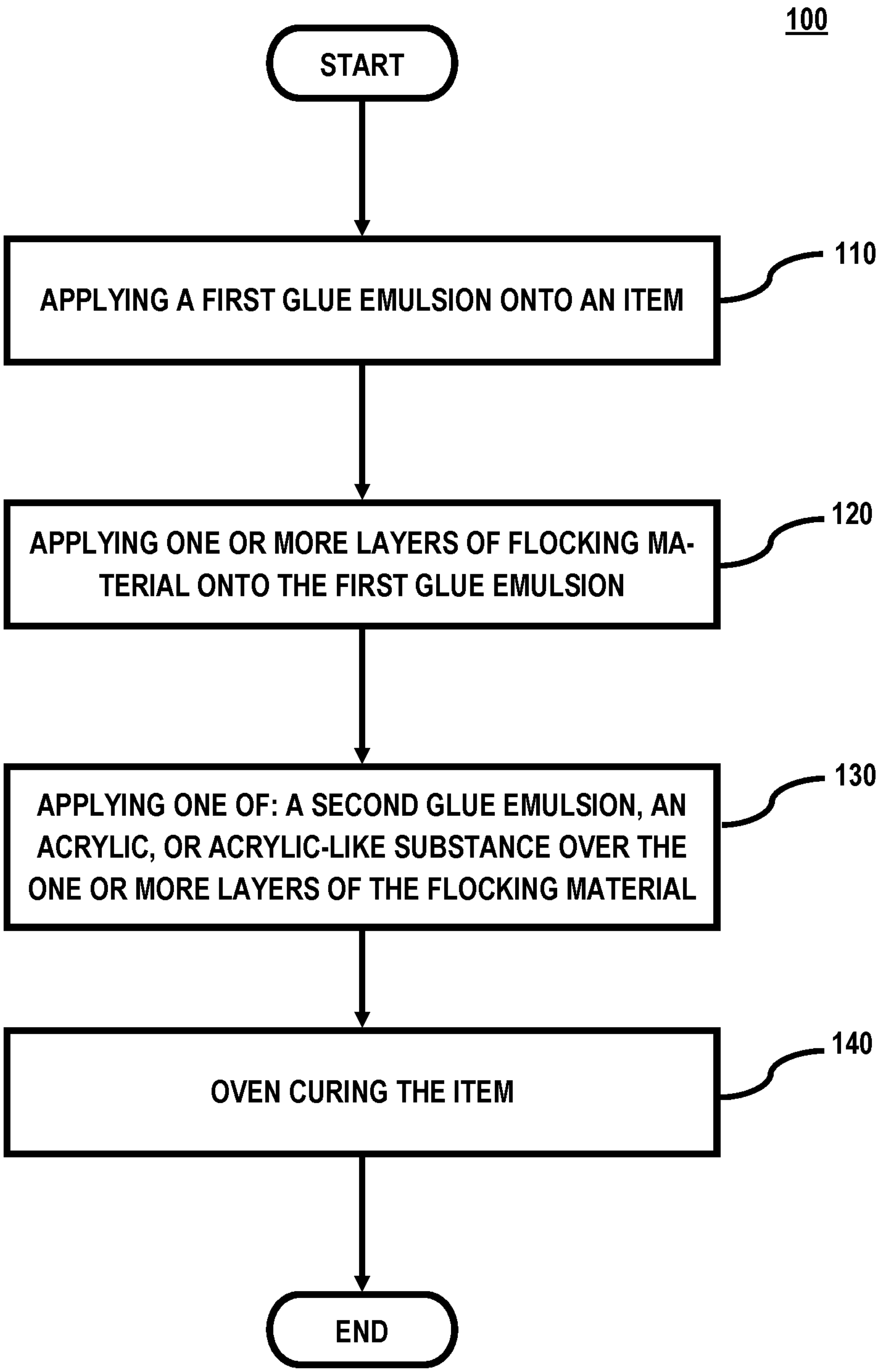
FIG. 2 illustrates a flowchart of an exemplary flocking method, consistent with some embodiments of the disclosure.

In some embodiments of the present disclosure, an improved flocking method is provided. FIG. 2 illustrates a flowchart of an exemplary flocking method 100, consistent with some embodiments of the disclosure. In some embodiments, flocking method 100 can be performed during the manufacturing process of a decorative item to reduce the undesired loss of flocking material.

Referring to flocking method 100, at step 110, a first glue emulsion can be applied onto a surface of a decorative item. It would be understood by those of skill in the art that a glue emulsion can be a glue or glue-like adhesive substance. In various embodiments, the item can be artificial or real Christmas trees or one or more branches thereof, wreaths, or the like, but the present disclosure is not limited thereto. In some embodiments, this process can be achieved by applying the first glue emulsion for a predetermined time, using a spray gun with a nozzle diameter of around 1.5 mm. Alternatively, the first glue emulsion need not be applied to the surface of an item.

At step 120, one or more layers of flocking material can be applied onto the first glue emulsion. In some embodiment, the flocking material can be various flocking material, and can include fine paper, pulp, reclaimed vine waste, and/or cotton particles. In some other embodiments, plastic substrates, like polyethylene terephthalate (PET) flakes, or any other man-made fiber, synthetic fiber, organic fibers and/or materials can be used as the flocking material. It would be appreciated that the materials listed above are merely examples and not meant to limit the present disclosure. In some embodiments, additives can be added in the flocking material for adjusting its color, texture, or other visual characteristics. Substances to be sprayed or otherwise applied to decorative items can change its color when being exposed to heat or forms of light. For example, the substances can include substances comprising, or using, photochromic and thermochromic inks or dyes, pigments, or other materials.

It would be appreciated that the material used as the flocking material and the number of the layers of flocking material can be selected based on practical needs for different products. In some embodiments, the diameter of an outlet nozzle for the flocking spray gun can be configured according to the needs of different products. For example, the diameter of the outlet nozzle can be set as around 1 mm, which is an example and not meant to limit the disclosure. It would be appreciated that, in some embodiments, the application of the glue emulsion can be performed after applying any or each layer of flocking material, acrylic, and/or acrylic-like substance.

At step 130, one of: a second glue emulsion, an acrylic, or acrylic-like substance can be applied over the one or more layers of flocking material by a sprayer, a spray gun, or the like. For example, the type of acrylic or the acrylic-like substance to be used can include water-based acrylic acid modified emulsion, which contains acrylate copolymer, and sodium lauryl sulfate surfactant, and phosphates, but the present disclosure is not limited thereto. In various embodiments, other acrylic or the acrylic-like substances can also be used. In some embodiments, the thickness of the applied second glue emulsion, acrylic, and/or acrylic-like substance can be within the range of approximately 0.5 mm to 1.5 mm, but the present disclosure is not limited thereto. In some embodiments, this process can be achieved by spraying the second glue emulsion, acrylic, and/or acrylic-like substance for a predetermined time (e.g., any value between approximately 15 seconds to 30 seconds) at a room temperature, using a spray gun with a nozzle diameter of around 1.5 mm. It would be appreciated that, in some embodiments, the application of the second glue emulsion, acrylic, and/or acrylic-like substances can be performed after spraying any or each layer of flocking material and/or glue emulsion.

At step 140, the item can be oven cured after the application of the second glue emulsion, acrylic, and/or acrylic-like substance. Particularly, oven curing involves using the heat to catalyze or initiate chemical and molecular-level structural changes in a polymeric material applied for bonding, protective coating, sealing, or other uses. The temperature, time and/or other parameters for the oven curing process can vary in various embodiments for optimization. In some embodiments, the oven-curing temperature can be within the range of approximately 50° C. to 60° C. In some embodiments, the duration time for the oven-curing can be within the range of approximately 30 minutes to 60 minutes. It would be appreciated that, in some embodiments, the oven curing of the second glue emulsion, acrylic, and/or acrylic-like substances can be performed after spraying any or each layer of flocking material and/or glue emulsion. Thus, the flocking material can be oven cured once or multiple times, depending upon the embodiment.

In addition, in some embodiments, before applying the second glue emulsion, acrylic, and/or acrylic-like substance to the item, additional or other pigments and materials, such as glitters with different colors and sizes, can be added to the second glue emulsion, acrylic, and/or acrylic-like substance to vary the look and feel of the flocking.

By performing steps 130 and 140, flocking method 100 can ensure that the flocking material better adheres to the subject item during use, such that the amount of dust that results over time with use can be reduced.

The second glue emulsion, acrylic, and/or acrylic-like substances are applied by spraying the item and then the subject item is exposed to oven curing.

In various embodiments of the present disclosure, flocking methods with the use of additional materials combined with additional step(s) in the manufacturing process are provided, which ensures that the flocking largely remains and adheres to the items on which it is applied over a much longer period of time. Accordingly, the flocking with less debris generated can be achieved.

Figure 3:
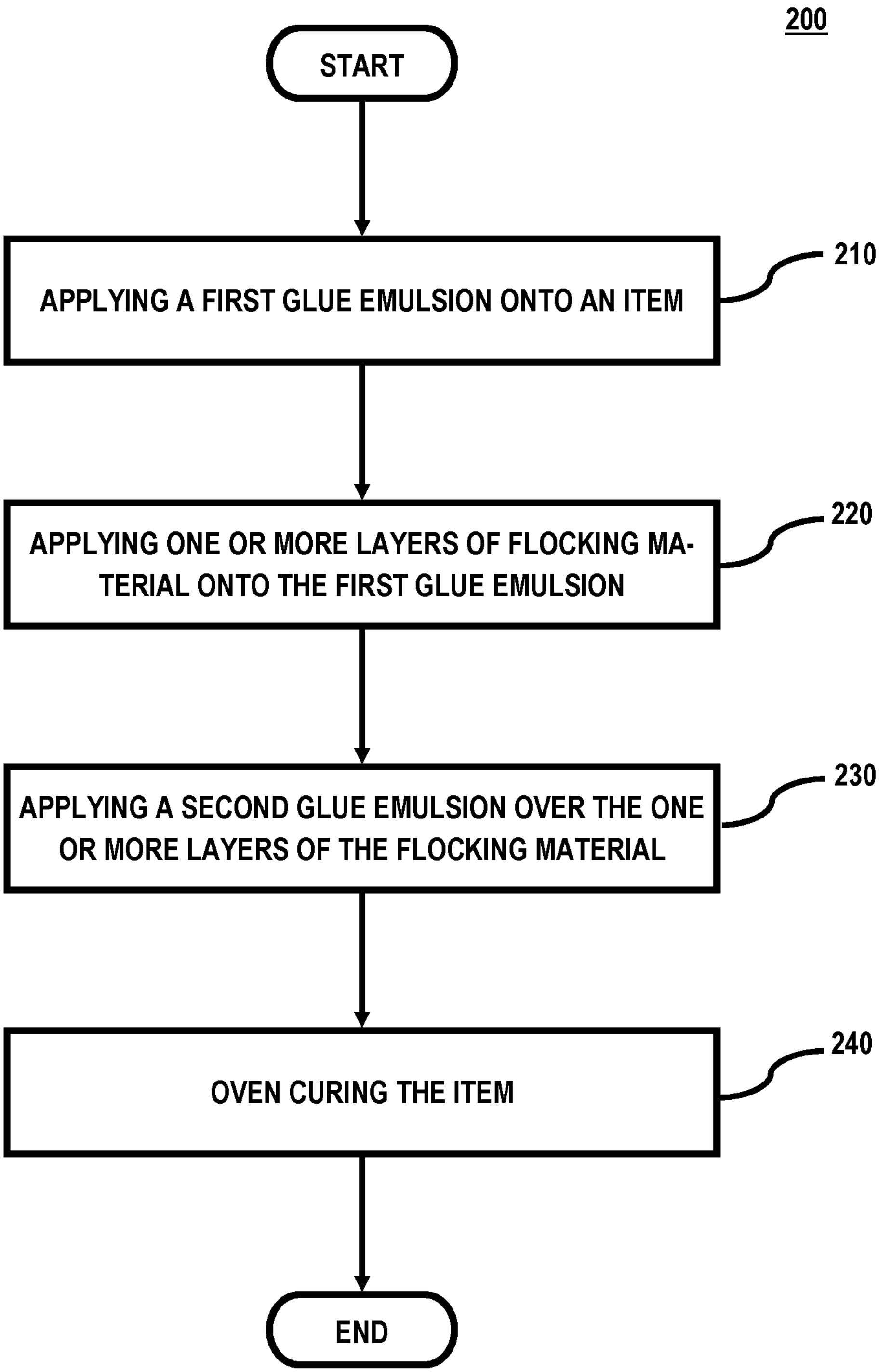
FIG. 3 illustrates a flowchart of an exemplary flocking method, consistent with some embodiments of the disclosure.

In some embodiments of the present disclosure, an improved flocking method is provided. FIG. 3 illustrates a flowchart of an exemplary flocking method 200, consistent with some embodiments of the disclosure. In some embodiments, flocking method 200 can be performed during the manufacturing process of a decorative item to reduce the undesired loss of flocking material.

Referring to flocking method 200, at step 210, a first glue emulsion can be applied onto an item. In various embodiments, the item can be artificial or real Christmas trees or one or more branches thereof, wreaths, or the like, but the present disclosure is not limited thereto. In some embodiments, this process can be achieved by applying the glue emulsion for a predetermined time, using a spray gun with a nozzle diameter of around 1.5 mm. The predetermined time can be, for example, 15 seconds, 23 seconds, or 30 seconds. Alternatively, the predetermined time can be any time between approximately 15 to 30 seconds. Alternatively, a first glue emulsion need not be applied to the after the application of the flocking material.

At step 220, one or more layers of flocking material can be applied onto the glue emulsion. In some embodiments, the flocking material can include fine paper, pulp, reclaimed vine waste, and/or cotton particles. In some other embodiments, plastic substrates, like polyethylene terephthalate (PET) flakes, or any other man-made fiber, synthetic fiber, organic fibers and/or materials can be used as the flocking material. It would be appreciated that the materials listed above are merely examples and not meant to limit the present disclosure. In some embodiments, additives can be added in the flocking material for adjusting its color, texture, or other visual characteristics. Substances to be sprayed or otherwise applied to decorative items can change its color when being exposed to heat or forms of light. For examples, the substances can include substances containing, or using, photochromic and thermochromic inks or dyes, pigments, or other materials.

It would be appreciated that the material used as the flocking material and the number of the layers of flocking material can be selected based on practical needs for different products. In some embodiments, the diameter of an outlet nozzle for the flocking spray gun can be configured according to the needs of different products. For example, the diameter of the outlet nozzle can be set as around 1 mm, which is an example and not meant to limit the disclosure. It would be appreciated that, in some embodiments, the application of the glue emulsion can be performed after spraying any or each layer of flocking material. The application of the glue emulsion has been described above and thus further explanation would not be repeated herein.

At step 230, a second glue emulsion can be applied over the one or more layers of flocking material by a sprayer, a spray gun, or the like. The second glue emulsion can be natural and can include, for example, cellulose and/or starch. Alternatively, the second glue emulsion can be synthetic, but the present disclosure is not limited thereto. In various embodiments, other glue emulsions can also be used. In some embodiments, the thickness of the applied second glue emulsion can be within the range of approximately 0.5 mm to 1.5 mm, but the present disclosure is not limited thereto. In some embodiments, this process can be achieved by spraying the second glue emulsion for a predetermined time (e.g., any value between approximately 15 seconds to 30 seconds) at a room temperature, using a spray gun with a nozzle diameter of around 1.5 mm. It would be appreciated that, in some embodiments, the application of the second glue emulsion can be performed after spraying any or each layer of flocking material.

At step 240, the item can be oven cured after the application of the second glue emulsion. Particularly, oven curing involves using the heat to catalyze or initiate chemical and molecular-level structural changes in a polymeric material applied for bonding, protective coating, sealing, or other uses. The temperature, time and/or other parameters for the oven curing process can vary in various embodiments for optimization. In some embodiments, the oven-curing temperature can be within the range of approximately 50° C. to 60° C. In some embodiments, the duration time for the oven-curing can be within the range of approximately 30 minutes to 60 minutes. It would be appreciated that, in some embodiments, the oven curing of the second glue emulsion can be performed after spraying any or each layer of flocking material and/or glue emulsion.

In addition, in some embodiments, before applying the second glue emulsion to the item, additional or other pigments and materials, such as glitters with different colors and sizes, can be added to the second glue emulsion to vary the look and feel of the flocking.

By performing steps 230 and 240, flocking method 200 can ensure that the flocking material better adheres to the subject item during use, such that the amount of dust or debris that results over time with use can be reduced.

The second glue emulsion is applied by spraying the item and then the subject item is exposed to oven curing.

In various embodiments of the present disclosure, flocking methods with the use of additional materials combined with additional step(s) in the manufacturing process are provided, which ensures that the flocking largely remains and adheres to the items on which it is applied over a much longer period of time. Accordingly, the flocking with less debris generated can be achieved.

Figure 4:
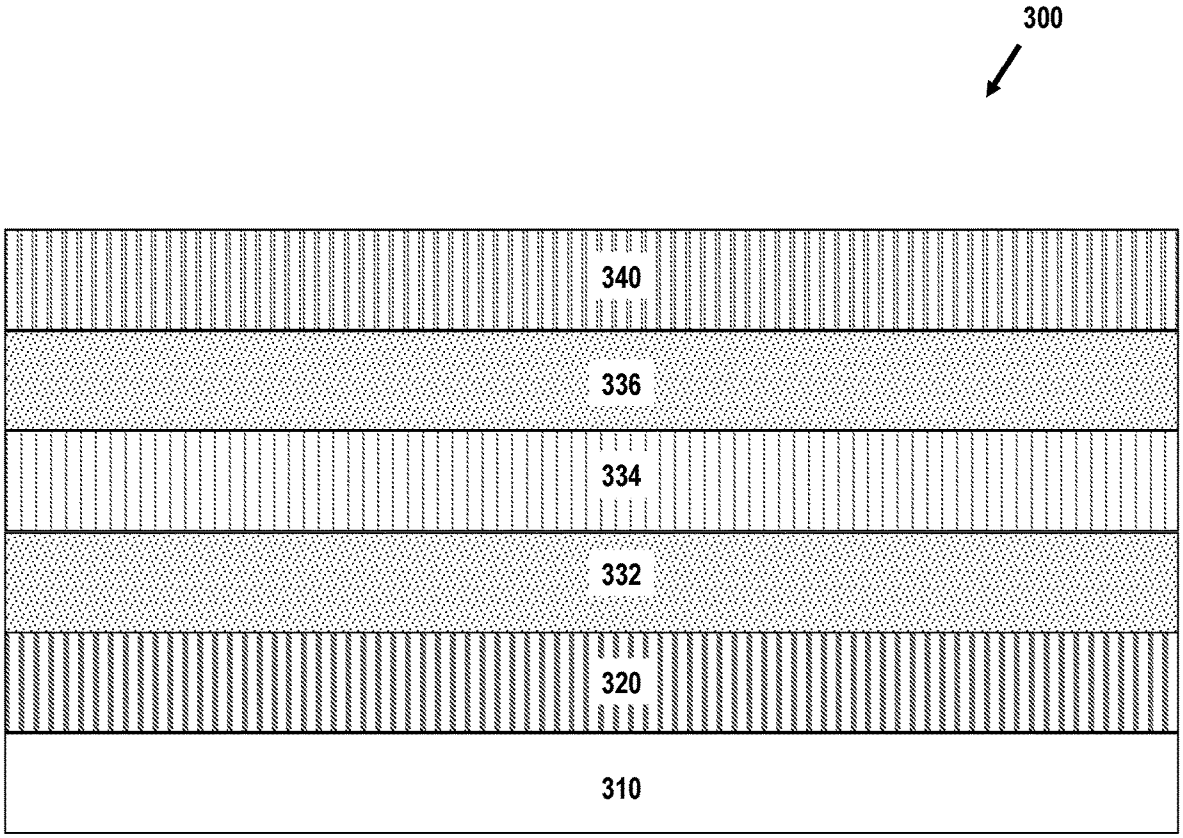
FIG. 4 illustrates an exemplary decorative item, consistent with some embodiments of the disclosure.

Reference is made to FIG. 4, which illustrates a decorative item 300, consistent with some embodiments of the disclosure. As shown in FIG. 4, decorative item 300 includes a layer 320 of the first glue emulsion applied on a surface 310 of decorative item 300, one or more layers 332, 334, and 336 of flocking material, and a layer 340 of the acrylic or acrylic-like substance applied on layers 332, 334, and 336 of flocking material. Additionally or alternatively, the layer 340 can be a second glue emulsion applied on one or more layers 332, 334, and 336 of flocking material. Details of layers 330, 332, 334, 336, 340 and corresponding manufacturing processes have been described above. Those skilled in the art can understand that, although one layer 340 is illustrated in FIG. 4 for the ease of understanding, in some embodiments, the acrylic, acrylic-like substance, or glue emulsion is not merely a coating on a single layer. The adhesion process described above in the present disclose can also ensure fixation by penetration of the flocking material.

In some embodiments, the disclosed materials and methods can be used and applied to a wreath, or branches of a real or artificial Christmas tree. In some other embodiments, decorative item 300 can be other decorative items, like ornaments and/or figures used for decorations. For example, decorative item 300 can be a life-sized ornamental reindeer that can be displayed in yards or common areas of buildings.

As mentioned above, additional pigments and materials can be applied to various decorative items 300, to vary the look and feel of the flocking. For example, materials that suggest the look of ice crystals, like small beads, can be applied in one or more of layers 320, 332, 334, 336, 340. In some embodiments, glitter having different colors and sizes can also be applied in one or more of layers 320, 332, 334, 336, 340.

In addition to Christmas-theme decoration, the disclosed methods can also be used for manufacturing other decorative items 300, such as items for Halloween, Thanksgiving, New Years, Valentines, or other holiday decoration, or items for different seasonal decorations, but the present disclosure is not limited thereto. For example, materials that suggest the look of spider cobwebs can be applied to the branches, to create an object for display at Halloween. In some other embodiments, materials made to look like foliage, leaves or berries can be applied to create a fall festival or autumn look, or to adorn decorative items with holly leaves and berries.

Figure 5:
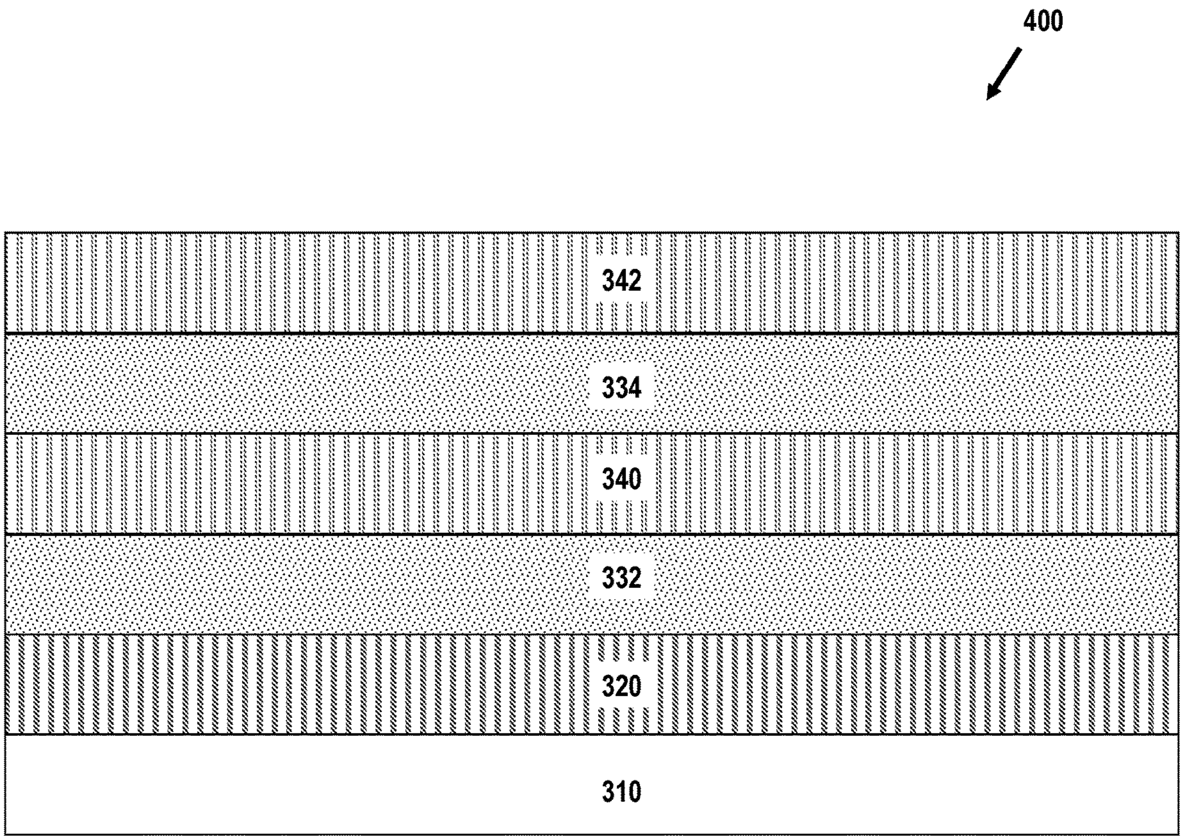
FIG. 5 illustrates an exemplary decorative item, consistent with some embodiments of the disclosure.

Reference is made to FIG. 5, which illustrates a decorative item 400, consistent with some embodiments of the disclosure. As shown in FIG. 5, decorative item 400 includes the layer 320 of the first glue emulsion applied on the surface 310 of decorative item 400, one or more layers 332, and 334 of flocking material, and one or more layers 340, and 342 of the acrylic or acrylic-like substance applied on or between layers 332 and 334 of flocking material. The decorative item 400, however, is not so limited. Greater or fewer number of layers 332, 334 of flocking material can be present between the layer of glue emulsion 320 and one or more layers 340, 342 of the acrylic or acrylic-like substance. Decorative item 400 can include greater or fewer number of layers 340, 342 of the acrylic or acrylic-like substance. Additionally, or alternatively, the one or more layers 340, and 342 can be a second glue emulsion and/or a third glue emulsion applied on or between layers 332, and 334 of the flocking material. Details of layers 330, 332, 334, 340, 342 and corresponding manufacturing processes have been described above. The adhesion process described above in the present disclose can also ensure fixation by penetration of the flocking material.

In some embodiments, the disclosed materials and methods can be used and applied to a wreath, or branches of a real or artificial Christmas tree. In some other embodiments, decorative item 400 can be other decorative items, like ornaments and/or figures used for decorations. For example, decorative item 400 can be a life-sized ornamental reindeer that can be displayed in yards or common areas of buildings.

As mentioned above, additional pigments and materials can be applied to various decorative items 400, to vary the look and feel of the flocking. For example, materials that suggest the look of ice crystals, like small beads, can be applied in one or more of layers 320, 332, 334, 340, 342. In some embodiments, glitter having different colors and sizes can also be applied in one or more of layers 320, 332, 334, 340, 342.

In addition to Christmas-theme decoration, the disclosed methods can also be used for manufacturing other decorative items 400, such as items for Halloween decoration, or items for different seasonal decorations, but the present disclosure is not limited thereto. For example, materials that suggest the look of spider cobwebs can be applied to the branches, to create an object for display at Halloween. In some other embodiments, materials made to look like foliage, leaves or berries can be applied to create a fall festival or autumn look, or to adorn decorative items with holly leaves and berries.

Figure 6:
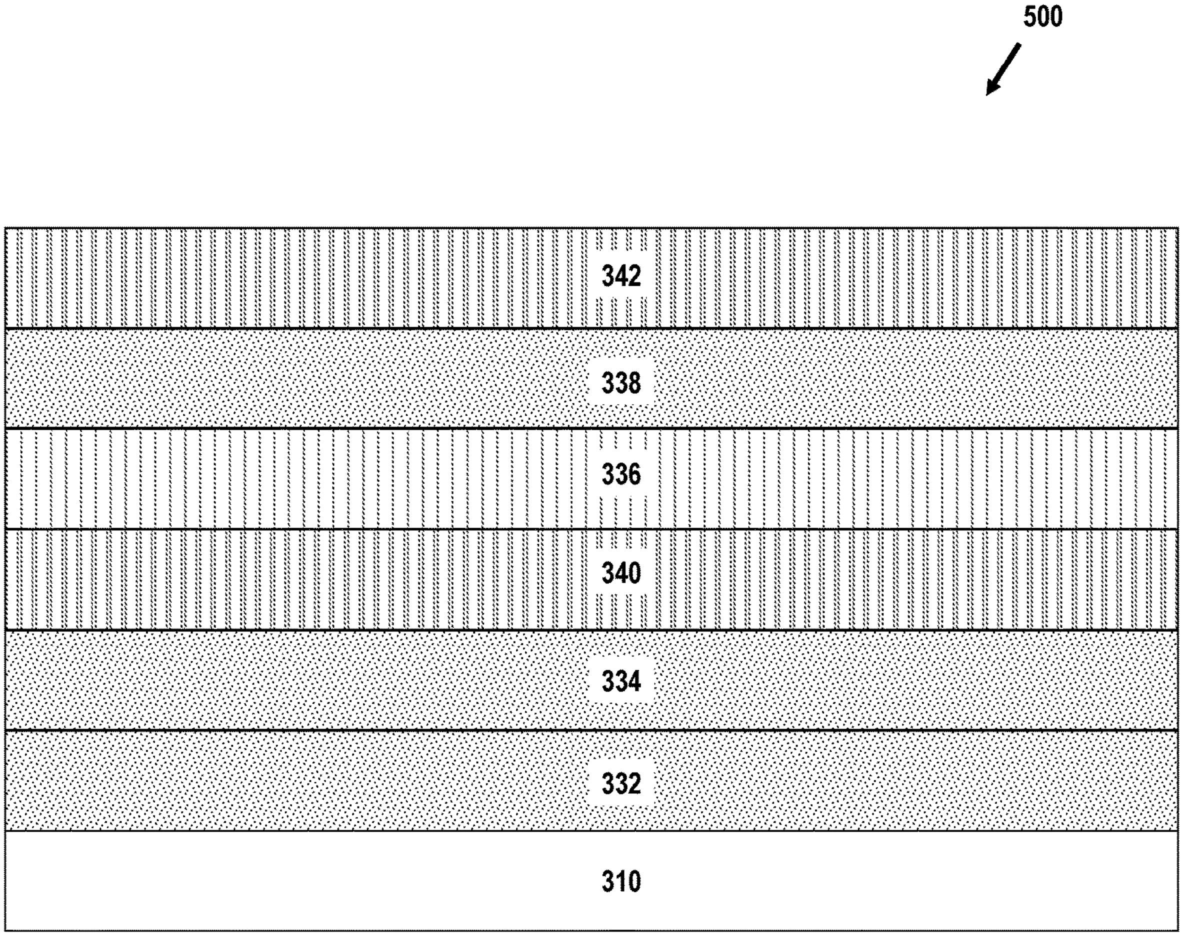
FIG. 6 illustrates an exemplary decorative item, consistent with some embodiments of the disclosure.

Reference is made to FIG. 6, which illustrates a decorative item 500, consistent with some embodiments of the disclosure. As shown in FIG. 6, decorative item 500 includes a surface 310, one or more layers 332, 334, 336, 338 of flocking material, and one or more layers 340, and 342 of the acrylic or acrylic-like substance applied on or between layers 334, 336, and 338 of flocking material. The decorative item 500, however, is not so limited. Greater or fewer number of layers 336, 338 of flocking material can be present between one or more layers 340 and 342 of the acrylic or acrylic-like substance. Greater or fewer number of layers 332, 334 can be between the surface 310 and layer 340 of the acrylic or acrylic-like substance. Additionally or alternatively, the one or more layers 340, and 342 can be a second and/or a third glue emulsion applied on or between layers 334, 336, and 338 of flocking material. Details of layers 330, 332, 334, 338, 340, 342 and corresponding manufacturing processes have been described above. The adhesion process described above in the present disclose can also ensure fixation by penetration of the flocking material.

In some embodiments, the disclosed materials and methods can be used and applied to a wreath, or branches of a real or artificial Christmas tree. In some other embodiments, decorative item 500 can be other decorative items, like ornaments and/or figures used for decorations. For example, decorative item 500 can be a life-sized ornamental reindeer that can be displayed in yards or common areas of buildings.

As mentioned above, additional pigments and materials can be applied to various decorative items 500, to vary the look and feel of the flocking. For example, materials that suggest the look of ice crystals, like small beads, can be applied in one or more of layers 332, 334, 336, 338, 340, 342. In some embodiments, glitter having different colors and sizes can also be applied in one or more of layers 332, 334, 336, 338, 340, 342.

In addition to Christmas-theme decoration, the disclosed methods can also be used for manufacturing other decorative items 500, such as items for Halloween decoration, or items for different seasonal decorations, but the present disclosure is not limited thereto. For example, materials that suggest the look of spider cobwebs can be applied to the branches, to create an object for display at Halloween. In some other embodiments, materials made to look like foliage, leaves or berries can be applied to create a fall festival or autumn look, or to adorn decorative items with holly leaves and berries.

In the foregoing specification, embodiments have been described with reference to numerous specific details that can vary from implementation to implementation. Certain adaptations and modifications of the described embodiments can be made. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a module can include A or B, then, unless specifically stated otherwise or infeasible, the module can include A, or B, or A and B. As a second example, if it is stated that a module can include A, B, or C, then, unless specifically stated otherwise or infeasible, the module can include A, or B, or C, or A and B, or A and C, or B and C, or A and B and C.

As used herein, the terms "comprises," "comprising," or any other variation thereof are intended to cover a non-exclusive inclusion, such that a process, method, composition, article, or apparatus that comprises a list of elements does not include only those elements but can include other elements not expressly listed or inherent to such process, method, composition, article, or apparatus. The term "exemplary" is used in the sense of "example" rather than "ideal."

In the drawings and specification, there have been disclosed exemplary embodiments. It will be apparent to those skilled in the art that various modifications and variations can be made to the disclosed apparatuses, systems, and related methods. Other embodiments will be apparent to those skilled in the art from consideration of the specification and practice of the disclosed apparatuses, systems, and related methods. It is intended that the specification and examples be considered as exemplary only, with a true scope being indicated by the following claims and their equivalents.

What is claimed is:

1. A flocking method, comprising:
- applying a first glue emulsion onto an item;
- applying one or more layers of flocking material onto the first glue emulsion;
- applying one of: a second glue emulsion or an acrylic substance, over the one or more layers of flocking material; and
- oven curing the item, the first glue emulsion, the one or more layers of flocking material and the second glue emulsion or the acrylic substance within a range of 50° C. to 60° C. for a time of 30 to 60 minutes;
- wherein a first nozzle configured to apply the one or more layers of flocking material has a first diameter;
- a second nozzle configured to apply the second glue emulsion or the acrylic substance has a second diameter; and
- the second diameter is greater than the first diameter; and wherein the item comprises a wreath or one or more branches of an artificial tree or natural tree.

2. The flocking method of claim 1, further comprising:
- adding one or more pigments, one or more decorative materials, or a combination thereof, to one of: the second glue emulsion or the acrylic substance before applying the second glue emulsion or the acrylic substance to the item.

3. The flocking method of claim 1, wherein the flocking material comprises fine paper, pulp, reclaimed vine waste, or cotton particles.

4. The flocking method of claim 1, wherein the one or more layers of flocking material comprises polyethylene terephthalate flakes, synthetic fibers, or organic fibers.

5. The flocking method of claim 2, further comprising:
adding one or more pigments to one of: the second glue emulsion or the acrylic substance before applying second glue emulsion or the acrylic substance to the item;
wherein the one or more pigments comprise a photochromic or thermochromic ink.

6. The flocking method of claim 1, further comprising:
adding a plurality of glitters comprising different colors and sizes to one of: the second glue emulsion or the acrylic substance before applying second glue emulsion or the acrylic substance to the item.

7. The flocking method of claim 1, wherein at least one of the first glue emulsion and the second glue emulsion or the acrylic substance further comprises at least one bead.

8. A flocking method, comprising:
applying a first glue emulsion onto an item;
applying a first layer of flocking material onto the item;
applying a second glue emulsion over the one or more layers of flocking material; and
oven curing the item, the first glue emulsion, the first layer, and the second glue emulsion within a range of 50° C. to 60° C. for a time of 30 to 60 minutes;
wherein a first nozzle configured to apply the first layer of flocking material has a first diameter;
a second nozzle configured to apply the second glue emulsion has a second diameter; and
the second diameter is greater than the first diameter; and wherein the item comprises a wreath or one or more branches of an artificial tree or natural tree.

9. The flocking method of claim 8, further comprising:
adding one or more pigments, one or more decorative materials, or a combination thereof, to the second glue emulsion.

10. The flocking method of claim 8, wherein the flocking material comprises fine paper, pulp, reclaimed vine waste, or cotton particles.

11. The flocking method of claim 8, further comprising:
applying a second layer of flocking material onto the item.

12. The flocking method of claim 11, further comprising:
applying a third glue emulsion over the second layer of flocking material.

13. The flocking method of claim 12, further comprising:
applying an acrylic substance to the third glue emulsion.

14. The flocking method of claim 8, wherein the first layer of flocking material comprises polyethylene terephthalate flakes, synthetic fibers, or organic fibers.

15. The flocking method of claim 9, further comprising:
adding one or more pigments to the second glue emulsion before applying the second glue emulsion to the item;
wherein the one or more pigments comprise a photochromic or thermochromic ink.

16. The flocking method of claim 8, further comprising:
adding a plurality of glitters comprising different colors and sizes to the second glue emulsion before applying the second glue emulsion to the item.

17. The flocking method of claim 8, wherein at least one of the first glue emulsion and the second glue emulsion further comprises at least one bead.

18. A flocking method, comprising:
applying a first glue emulsion onto an item;
applying one or more layers of flocking material onto the first glue emulsion;
applying one of: a second glue emulsion or an acrylic substance, over the one or more layers of flocking material; and
oven curing the item, the first glue emulsion, the one or more layers of flocking material and the second glue emulsion or the acrylic substance within a range of 50° C. to 60° C. for a time of 30 to 60 minutes;
wherein a first nozzle configured to apply the one or more layers of flocking material has a first diameter;
a second nozzle configured to apply the second glue emulsion or the acrylic substance has a second diameter; and
the second diameter is greater than the first diameter.

19. A flocking method, comprising:
applying a first glue emulsion onto an item;
applying a first layer of flocking material onto the item; and
applying a second glue emulsion over the one or more layers of flocking material;
wherein a first nozzle configured to apply the first layer of flocking material has a first diameter;
a second nozzle configured to apply the second glue emulsion has a second diameter; and
the second diameter is greater than the first diameter; and wherein the item comprises a wreath or one or more branches of an artificial tree or natural tree.

* * * * *